June 24, 1958  M. J. BROWN  2,840,723
VOLTAGE BALANCING SYSTEM
Filed Sept. 22, 1954  4 Sheets-Sheet 1

WITNESSES:
E. A. McCloskey
Wm. B. Sellers

INVENTOR
Myron J. Brown.
BY
Paul E. Friedemann
ATTORNEY

June 24, 1958

M. J. BROWN 2,840,723

VOLTAGE BALANCING SYSTEM

Filed Sept. 22, 1954

June 24, 1958 M. J. BROWN 2,840,723
VOLTAGE BALANCING SYSTEM
Filed Sept. 22, 1954 4 Sheets-Sheet 3

June 24, 1958  M. J. BROWN  2,840,723
VOLTAGE BALANCING SYSTEM
Filed Sept. 22, 1954  4 Sheets-Sheet 4

United States Patent Office 2,840,723
Patented June 24, 1958

2,840,723

VOLTAGE BALANCING SYSTEM

Myron J. Brown, Forest Hills, Pa., assignor to Westinghouse Electric Corporation, East Pittsburgh, Pa., a corporation of Pennsylvania Application September 22, 1954, Serial No. 457,675

2 Claims. (Cl. 307—57)

This invention relates to the regulation of electric sources, and relates more particularly to the regulation of alternating current generators, known as alternators.

Alternators are regulated by varying the direct current voltage supplied by exciter generators to their field windings. The currents flowing through such field windings are large and to use them at regulating control points would require heavy current leads, and heavy windings in the controls.

This invention uses magnetic amplifiers for regulating alternators and the like. In one embodiment of the invention for balancing the field excitation voltages of two alternators, a magnetic amplifier is connected to each of two shunts in the field circuits of the two generators. The outputs of the amplifiers are supplied into coils of a polarized relay which detects the direction of unbalance and energizes a motor to drive a rheostat in the field circuit of one of the alternators to provide a balance.

This invention can also be used to regulate an alternator or other electric source by using a voltage standard as a reference source, and can be used to regulate or balance voltage, current, watts or reactive volt amperes.

An object of this invention is to use a magnetic amplifier to regulate an electric source.

Another and somewhat more specific object of this invention is to use magnetic amplifiers to regulate alternators.

This invention will now be described with reference to the accompanying drawings, in which.

Figure 1:
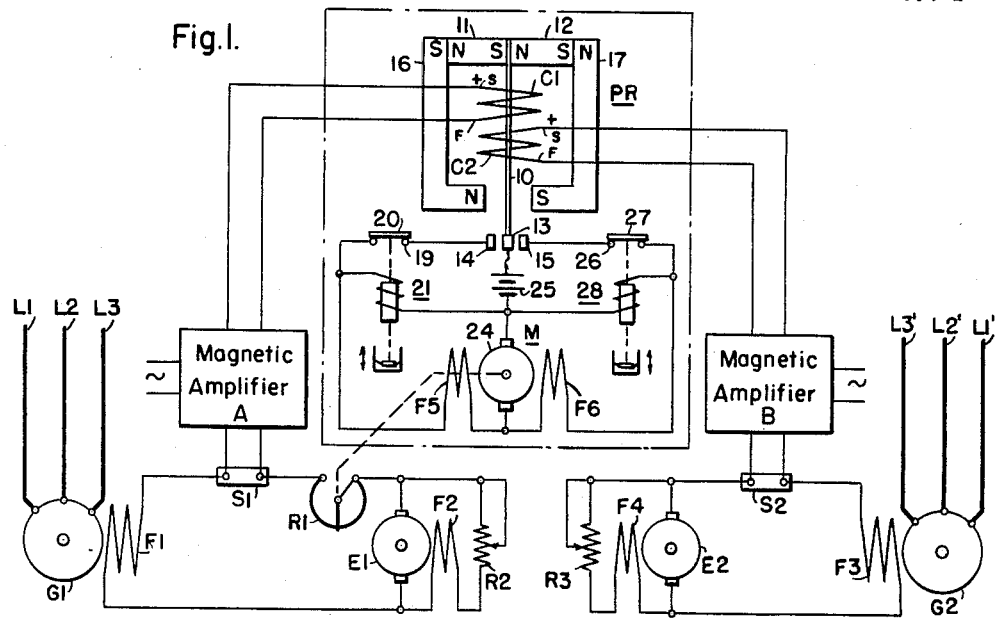
Fig. 1 is a diagrammatic view of one embodiment of this invention for balancing the excitation voltages of two alternators.

Referring now to Fig. 1 of the drawings, the excitation voltage of the generator G1 is to be balanced with that of the generator G2. The generator G1 has a field winding F1 connected in series with the shunt S1, the motor driven rheostat R1 and the parallel circuit including the armature of the exciter generator E1, and the field winding F2 in series with the rheostat R2 connected across the armature of generator E1.

The shunt S1 is connected across the input of the magnetic amplifier A, the output of which is applied to the coil C1 of the polarized relay PR.

The generator G2 has its field winding F3 connected in series with the shunt S2 and in series with the parallel circuit including the armature of the exciter generator E2 and the field winding F4 in series with the rheostat R3 across the armature of generator E2. The shunt S2 is connected across the input of the magnetic amplifier B, the output of which is applied to the coil C2 of the polarized relay PR.

The polarized relay PR has a flexible armature 10 of spring metal which is suspended at its upper end between the inner ends of the permanent magnets 11 and 12, and which extends through the open centers of the coils C1 and C2 and terminates at its lower end in a contact 13 which normally is midway between the contacts 14 and 15. The permanent magnets 16 and 17 have upper ends in contact with the outer ends of the magnets 11 and 12 respectively, and have lower ends which turn inwardly at right angles towards but spaced from the armature 10 between the coil C2 and the contact 13. The magnets 11, 12, 16 and 17 are poled as indicated thereon.

The coils C1 and C2 have equal numbers of turns wound in the same direction from S (start) to F (finish). When equal currents are flowing through the two coils, the contact 13 will remain midway between the contacts 14 and 15.

The contact 14 is connected to the right-hand of the relay contacts 19 which contacts normally are in contact with the relay armature 20 of the relay 21. One side of the energizing winding of the relay 21 is connected to the left-hand relay contact and to one side of the field winding F5 of the electric motor M, the other side of the winding F5 being connected to one side of the armature 24 of the motor M, the other side of the armature 24 being connected to the other side of the energizing winding of the relay 21 which is connected to one side of the battery 25. The other side of the battery 25 is through contact 13 grounded to the magnet 17. The contact 15 is connected to the left-hand of the relay contacts 26 which contacts normally are in contact with the armature 27 of the relay 28. One side of the energizing winding of the relay 28 is connected to the right-hand of the relay contacts and to one side of the field winding F6 of the motor M, the other side of the winding F6 being connected to one side of the armature 24 of the motor M, the other side of the armature 24 being connected to the other side of the energizing winding of the relay 28 which is connected to the side of the battery 25 which is opposite the side connected to the magnet 17.

The armature 24 of the motor M is coupled to the rheostat R1 for rotatably adjusting it for varying the voltage supplied by the exciter E1 to the field winding F1 of the generator G1.

In the operation of Fig. 1, if the exciter voltages of the two generators G1 and G2 are balanced, the same current will flow through the shunts S1 and S2, the same voltage drop across the shunts will be supplied to the inputs of the two magnetic amplifiers A and B, and the same current will flow through the coils C1 and C2. The contact 13 will remain midway between the contacts 14 and 15.

If the excitation voltage of the generator G1 falls below that of the generator G2 or the excitation voltage of the generator G2 rises above that of the generator G1, the current flowing through the shunt S1 will be less than that flowing through the shunt S2 so that the output of the amplifier A will be less than that of the amplifier B. Less current will flow through the coil C1 than through the coil C2 so that the contact 13 of the polarized relay PR will touch the contact 14 closing a circuit connecting the armature 24 of the motor M in series with its field winding F5 and the battery 25, causing the armature 24 to rotate in a direction to adjust the rheostat R1 to raise the excitation voltage of the generator G1.

At the same time the motor M is energized by the contact 13 touching the contact 14, the relay 21 is energized. It is a time delay pick-up and time delay drop-out relay, and after a short period of time actuates its armature 20 opening the energizing circuit of the motor M and of the relay 21. A short time after the relay 21 is so deenergized, its armature 20 will move back against the contact 19 again energizing the motor M and the relay 21. This relay 21 and its associated relay 28 to be described in the following, are conventional anti-hunt interrupters.

When the excitation voltage of the generator G1 is raised to equal that of the generator G2, there will again be equal currents in the shunts S1 and S2 and in the coils C1 and C2 so that the relay contact 13 will return to its mid-position between the contacts 14 and 15.

If the excitation voltage of the generator G1 increases above that of the generator G2 or the excitation voltage of the generator G2 decreases below that of the generator G1, the current flowing through the shunt S1 will be greater than that flowing through the shunt S2 so that the output of the amplifier A will be greater than that of the amplifier B. More current will flow through the coil C1 than through the coil C2 so that the contact 13 of the polarized relay PR will move against the contact 15, closing a circuit connecting the armature 24 of the motor M in series with its reverse field winding F6 and the battery 25, causing the armature 24 to rotate in the direction to adjust the rheostat R1 to lower the excitation voltage supplied to the generator G1.

At the same time the motor M is energized by the contact 13 touching the contact 15, the relay 28 is energized, and after a short period of time, operates its armature 27 opening its energizing circuit and that of the motor M. A short time after the relay 28 is so deenergized, its armature 27 will move back against its contact 26, again energizing the motor M and the relay 28.

When the excitation voltage of the generator G1 is lowered to equal that of the generator G2, there will again be equal currents through the shunts S1 and S2 and through the coils C1 and C2 so that the relay contact 13 will return to its mid-position between the contacts 14 and 15, and the adjustment of the rheostat R by the motor M will cease.

The use of the magnetic amplifiers provides electrical insulation from the exciter circuits, and avoids the necessity for heavy current leads from the shunts to the polarized relay and for heavy windings in the coils of the polarized relay. The magnetic amplifiers A and B are conventional ones of the type in which D. C. input voltages act to decrease the impedance of the output circuit in which rectified A. C. flows.

Figure 2:
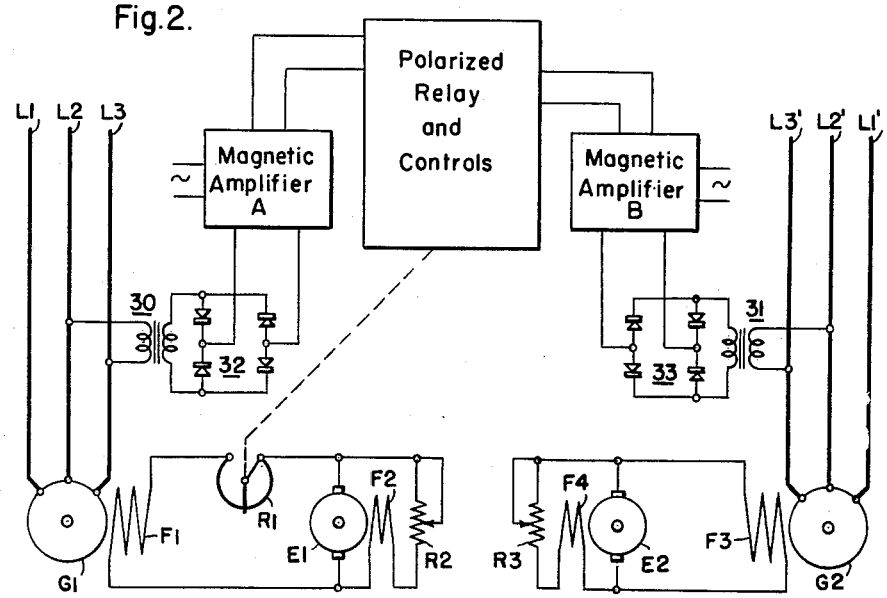
Fig. 2 is a diagrammatic view showing how Fig. 1 would be modified for balancing the terminal voltages of two alternators.

Fig. 2 illustrates how Fig. 1 would be modified for balancing the terminal voltages of the two alternators. Instead of connecting the inputs of the amplifiers A and B to the shunts S1 and S2 respectively, they are connected through the potential transformers 30 and 31 respectively, and the bridge rectifiers 32 and 33 respectively, to one phase of the three-phase of each generator output. The alternating current output voltage is reduced in the transformers; is changed to direct current by the rectifiers, and then is used to operate the magnetic amplifiers which operate the polarized relay as above described. An increase in the terminal voltage of the generator G1 above that of the generator G2 will result in the motor M being energized so that its armature will rotate to adjust the rheostat R1 to lower the exciter voltage of the generator G1 resulting in a lowering of its terminal voltage. A decrease in the terminal voltage of the generator G1 below that of the generator G2 will result in the motor M being energized so that its armature 24 will rotate to adjust the rheostat R1 to raise the excitation voltage of the generator resulting in the raising of its terminal voltage.

Figure 3:
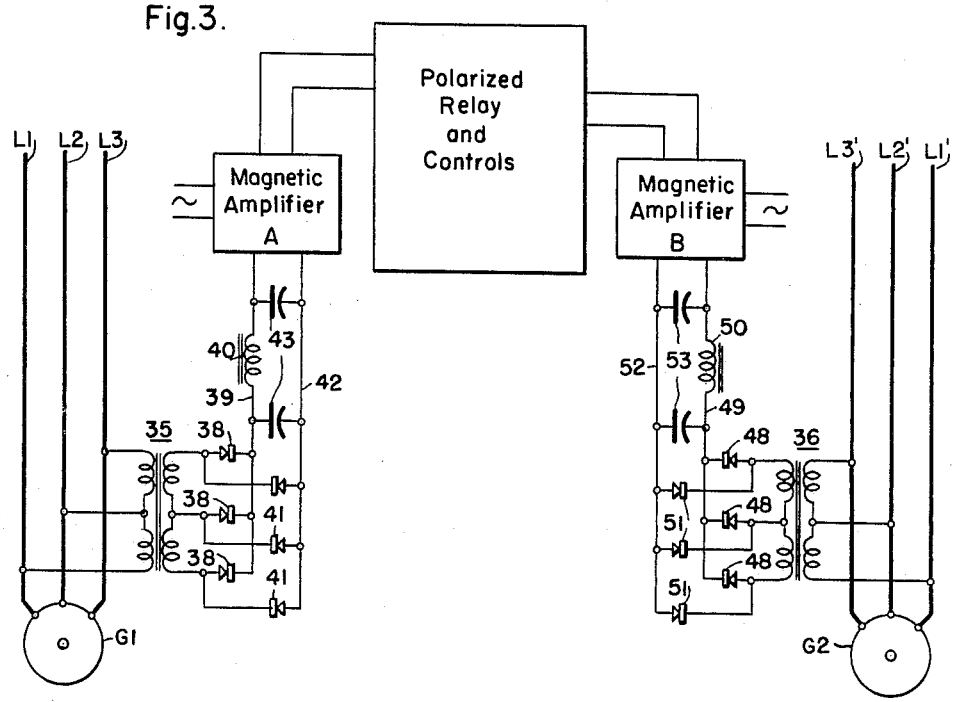
Fig. 3 is a diagrammatic view showing how Fig. 1 would be modified for balancing positive sequence voltages of two alternators.

Fig. 3 illustrates how Fig. 1 would be modified for balancing the positive sequence voltages of the two generators. Instead of connecting the amplifiers A and B to the shunts S1 and S2 respectively, they are connected through potential transformers and rectifiers to the three phases of the generator outputs, and are supplied with direct current voltages which are proportional to the positive sequence voltages of the generators. The three-phase transformers 35 and 36 have their primary windings connected to the three-phase outputs of the generators G1 and G2 respectively. Each phase of the secondary windings of the transformer 35 is connected through a rectifier 38 to a lead 39 which is connected through the filter inductor 40 to the input of the amplifier A, and is connected through a reversely poled rectifier 41 to a lead 42 which is connected to the negative input terminal of the amplifier A. The filter capacitors 43 are connected to the leads 39 and 42 on opposite sides of the inductor 40. Each phase of the secondary windings of the transformer 36 is connected through a rectifier 48 to a lead 49 which is connected through the filter inductor 50 to the positive input terminal of the amplifier B, and is connected through a reversely poled rectifier 51 to a lead 52 which is connected to the negative input terminal of the amplifier B. The filter capacitors 53 are connected to the leads 49 and 52 on opposite sides of the inductor 50.

In the operation of Fig. 3, direct current voltages proportional to the positive sequence voltages of the generators G1 and G2 are supplied to the inputs of the amplifiers A and B which operate the polarized relay PR and the motor M as described in the foregoing, to adjust the excitation voltage of the generator G1 until its positive sequence voltage is equal to that of the generator G2.

Figure 4:
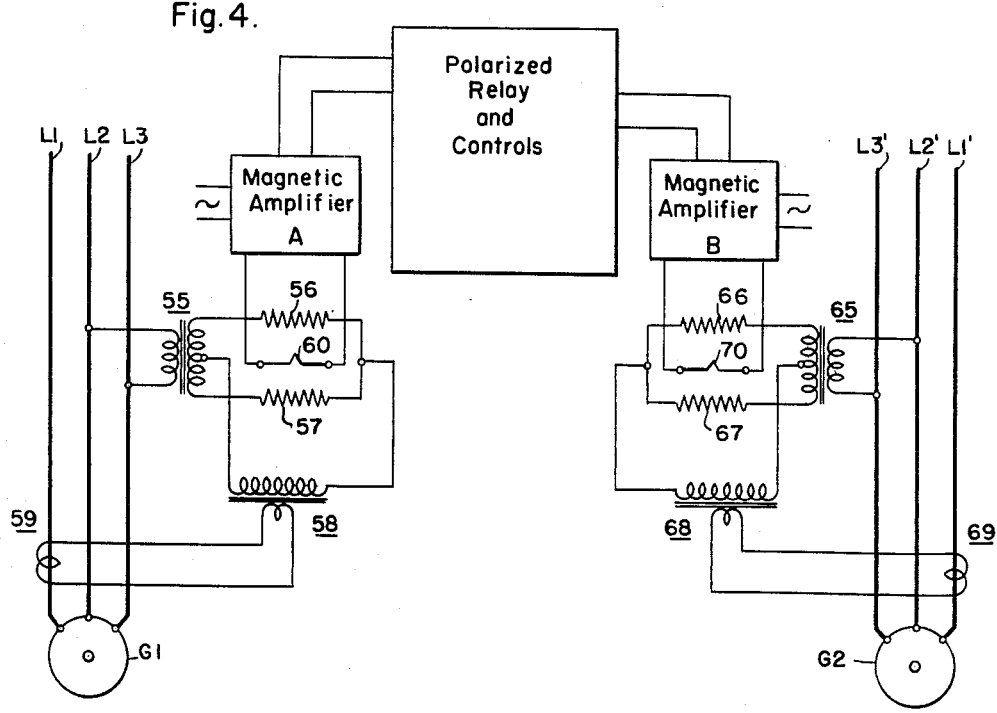
Fig. 4 is a diagrammatic view showing how Fig. 1 would be modified for balancing the reactive volt-amperes of two alternators.

Fig. 4 illustrates how Fig. 1 is modified to balance the reactive volts-amperes of the two alternators, using thermal converters connected to the inputs of the amplifiers A and B. The primary winding of the potential transformer 55 is connected to the output mains L2 and L3 of the generator G1, and its secondary winding is connected in series with the two heater resistors 56 and 57, the junction point of which is connected to one end of the secondary winding of the potential transformer 58, the other end of which is connected to the center point of the secondary winding of the transformer 55. The secondary winding of the current transformer 59 of which the main L1 is the primary, is connected to the primary winding of the transformer 58. The thermocouple 60 is connected to the input terminals of the amplifier A.

The thermocouple 60 is heated by the heat in the resistors 56 and 57 resulting from the current component supplied by the current transformer 59, and the voltage component supplied by the potential transformer, and supplies a direct current voltage to the input of the amplifier A which is proportional to the reactive volt amperes from the generator G1.

The primary winding of the potential transformer 65 is connected to the output mains L2' and L3' of the generator G2, and its secondary winding is connected in series with the two heater resistors 66 and 67, the junction point of which is connected to one end of the secondary winding of the transformer 68, the other end of which is connected to the center point of the secondary winding of the transformer 65. The secondary winding of the current transformer 69 of which the main L1' is the primary, is connected to the primary winding of the transformer 68. The thermocouple 70 is connected to the input terminals of the amplifier B.

The thermocouple 70 is heated by the heat in the resistors 66 and 67 resulting from the current component supplied by the current transformer 69 and the voltage component supplied by the potential transformer 65, and supplies a direct current voltage to the input of the amplifier B which is proportional to the reactive volt amperes from the generator G2.

The two thermal converters are conventional ones such as are manufactured by Leeds & Northrup, and described in its catalog N–58–161. Other forms of thermal converters could be used.

In the operation of Fig. 4, the thermal converters supply direct current voltages to the inputs of the amplifiers A and B which are proportional to the reactive volts amperes from the two generators, and the amplifiers operate the polarized relay PR and the motor M as described in the foregoing to adjust the excitation voltage of the generator G1 until its reactive volts amperes output equal that of the generator G2.

Figure 5:
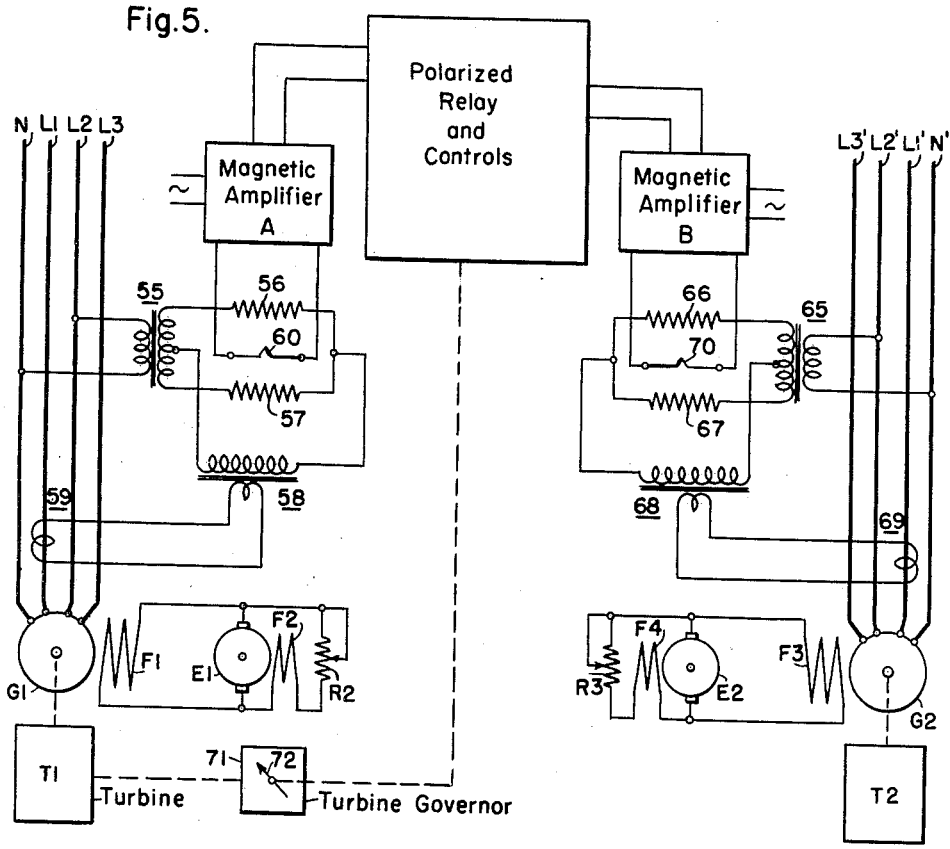
Fig. 5 is a diagrammatic view of another embodiment of this invention in which watts are balanced by control of a prime mover driving one of two alternators.

Fig. 5 illustrates an embodiment of this invention in which watts output of the two alternators are balanced by adjustment of the turbine driving the generator G1, thermal converters being used to provide direct current voltages to the inputs of the two magnetic amplifiers which are proportional to watts. The components of the polarized relay PR and its associated circuits are the same as described in connection with Fig. 1 and have been given the same reference characters. The same applies to the generators G1 and G2 and their exciters. The thermal converters are similar to those of Fig. 4 and have been given the same reference characters.

The turbine T1 drives the generator G1. A similar turbine as T2 is used to drive the generator G2. The turbine T1 has a conventional governor 71 which has a load level control 72 which is rotatably adjusted by the armature 24 of the motor M.

The primary winding of the transformer 55 instead of being connected to the power mains L2 and L3 of the generator G1 as in Fig. 4, are connected to the main L2 and to the neutral N. The primary winding of the transformer 65 instead of being connected to the power mains L2' and L3' of the generator G2 as in Fig. 4, are connected to the main L2' and to the neutral N'.

In the operation of Fig. 5, if the watts output of the generator G1 is below that of the generator G2, less heat will be applied by the heaters 56 and 57 to the thermocouple 60, resulting in a lower voltage delivered by the latter to the amplifier A. This will cause a decrease in the output of the amplifier A causing a decrease in the current flowing through the coil C1 of the polarized relay PR, causing the relay to become unbalanced and to cause its contact 13 to touch the contact 14. This will close the circuit energizing the motor M so that its armature 24 will rotate in a direction to adjust the load control 72 of the governor 71 to admit more steam to the turbine T1 causing the latter to increase its speed and that of the generator G1 so as to increase the watts output of the generator G1.

If the watts output of the generator G1 is above that of the generator G2, more heat will be applied by the heaters 56 and 57 to the thermocouple 60, resulting in a higher voltage delivered by the latter to the amplifier A. This will cause an increase in the output of the amplifier A, causing an increase in the current flowing through coil C1 of the polarized relay PR, causing the latter to become unbalanced and its contact 13 to touch the contact 15. This will close the circuit energizing the motor M so that its armature 24 will rotate in the direction to adjust the load control 72 of the governor 71 to admit less steam to the turbine T so as to decrease the watts output of the generator G1.

Figure 6:
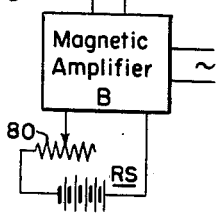
Fig. 6 is a diagrammatic view showing how Fig. 1 would be modified for regulating an alternator with reference to a constant voltage source.

Fig. 6 illustrates how Fig. 1 would be modified for adjusting the excitation voltage of the generator with reference to a constant voltage source instead of with reference to the excitation voltage of the generator G2. The generator G2 and its exciter circuit are omitted, being replaced by the reference voltage source RS which is connected in series with the variable resistor 80 to the input terminals of the amplifier B. The resistor 80 is provided for adjusting the voltage supplied by the source RS to the amplifier B.

If the excitation voltage of the generator G1 decreases so that the voltage supplied by the shunt S1 to the amplifier A is less than the voltage supplied by the source RS to the amplifier B, the current in the coil C1 will decrease below that in the coil C2 so that the polarized relay PR will be unbalanced to cause the contact 13 to touch the contact 14 causing the armature 24 of the motor M to rotate in the direction to adjust the rheostat R to increase the excitation voltage of the generator G1.

An increase in the excitation voltage of the generator G1 causing the voltage supplied by the shunt S1 to the amplifier A to be greater than the voltage supplied by the source RS to the amplifier B, will cause the opposite effect, the increased current flowing through the coil C1 causing the contact 13 to touch the contact 15, causing the armature 24 of the motor M to rotate in the direction to adjust the rheostat R to reduce the excitation voltage of the generator G1.

Figure 7:
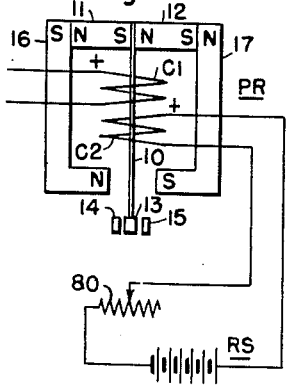
Fig. 7 is a diagrammatic view showing another method of modifying Fig. 1 for regulating an alternator with reference to a constant voltage source.

In Fig. 7 instead of connecting the source RS to the input of the amplifier B as in Fig. 6, the amplifier B is omitted and the source RS is connected directly to the coil C2. The magnetic amplifier A is supplied with AC by a regulated source which was unnecessary when the amplifier B was used since both amplifiers acting in opposition were effected to the same extent by AC fluctuations. The source RS in Fig. 7 is given a value which will enable it to supply the current to the coil C2 formerly supplied by the amplifier B to the same coil.

In the operation of Fig. 7, when the current supplied by the magnetic amplifier A increases as a result of the increase of the excitation voltage of the generator G1 so that the current through the coil C1 is greater than that from the source RS through the coil C2, the contact 13 of the polarized relay will touch the contact 15 causing the armature 24 of the motor M to rotate in the direction to adjust the rheostat R to decrease the excitation voltage of the generator G1. A decrease in the excitation voltage of the generator G1 will have the opposite effect, causing the current in the coil C1 to be less than that in the coil C2, and causing the relay contact 13 to touch the contact 14, and causing the motor M to be energized so that its armature 24 will adjust the rheostat R in the direction to increase the excitation voltage of the generator G1.

Figure 8:
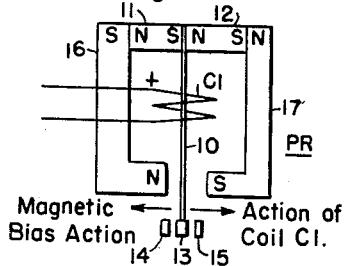
Fig. 8 is a diagrammatic view of another method of modifying Fig. 1 for regulating an alternator, using a magnetically biased polarized relay.

Fig. 8 shows how the constant voltage source RS and the coil C2 of Fig. 7 can be omitted by magnetically biasing the armature 10 of the polarized relay PR towards the inturned end of the magnet 16 as by making the magnet 16 larger or stronger than the magnet 17, so that the contact 13 will remain midway between the contacts 14 and 15 when the proper current is flowing through the coil C1. Otherwise Fig. 8 is similar to Fig. 7 and operates in the same way.

Figure 9:
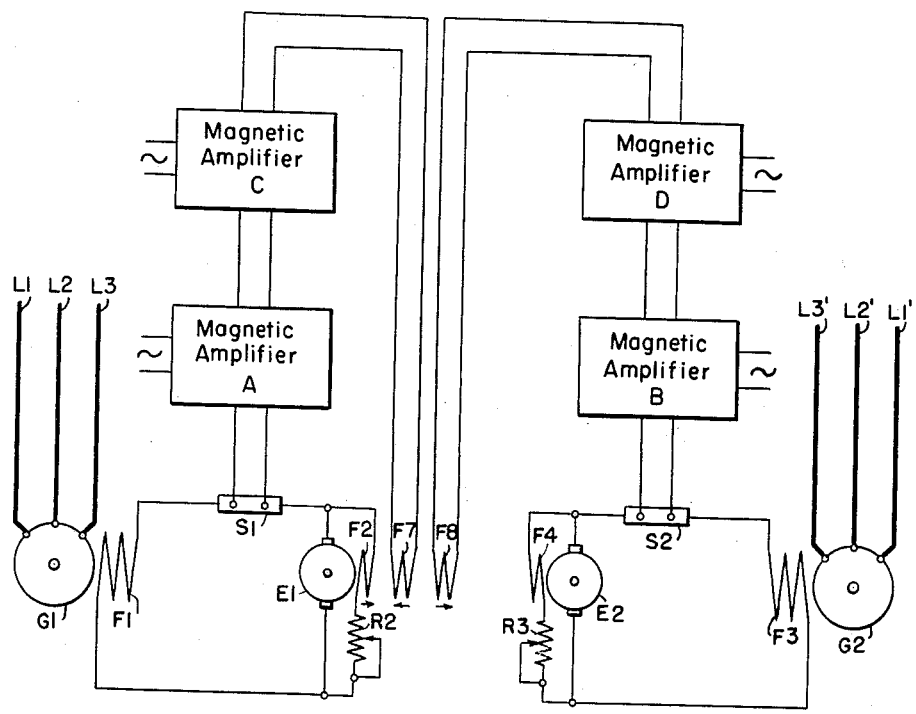
Fig. 9 is a diagrammatic view of another embodiment of this invention in which additional magnetic amplifiers are used for balancing two alternators.

Fig. 9 illustrates an embodiment of this invention in which the polarized relays PR, the motors M and their circuit components are omitted, and are replaced by additional magnetic amplifiers. The shunts S1 and S2 are connected to the magnetic amplifiers A and B respectively, as in Fig. 1, but instead of the outputs of the amplifiers being supplied to the coils of a polarized relay, the output of the amplifier A is connected to the input of an additional magnetic amplifier C, and the output of the amplifier B is connected to the input of an additional magnetic amplifier D. The output of the amplifier C is connected to the field winding F7 which is inductively coupled to the shunt field winding F2 of the exciter E1. The winding F7 is so wound and arranged that it opposes or bucks the winding F2. The output of the amplifier D is connected to the field winding F8 which is inductively coupled to the windings F2 and F7, and is so wound and arranged that it aids or boosts the winding F2. Normally, with the excitation voltages of the generators G1 and G2 the same, the field windings F7 and F8 have the same current flowing therethrough, and balance each other out so that neither has any effect on the winding F2.

If the excitation voltage of the generator G1 is above that of the generator G2, the output of the amplifier C will be greater than that of the amplifier D, causing the field winding F2 of the exciter E1 to be opposed by the field winding F7 so that the excitation voltage of the generator G2 will be reduced.

If the excitation voltage of the generator G1 is below that of the generator G2, the output of the amplifier C will be less than that of the amplifier D, so that the current in the field winding F8 is stronger than that in the winding F7, so that the field winding F8 aids the field winding F2 and raises the excitation voltage of the generator G1.

While I have shown and described several modifications it is understood that my invention is capable of still other arrangements all falling within the spirit and scope of my invention.

I claim as my invention:

1. A control for balancing two alternators comprising means providing a first direct current voltage indicative of the condition of excitation of one of said alternators, means providing a second direct current voltage indicative of the condition of excitation of the other of said alternators, magnetic amplifiers having their inputs connected to said voltage providing means, and means including means using the outputs of said amplifiers for adjusting one of said alternators until said voltages are equal, said alternators having field windings with exciters connected thereto, in which the voltage providing means are shunts connected in series with said exciters and said windings, and in which the adjusting means comprises means for adjusting the voltage supplied by one of said exciters to one of said field windings.

2. A control for balancing two alternators comprising means providing a first direct current voltage indicative of the condition of excitation of one of said alternators, means providing a second direct current voltage indicative of the condition of excitation of the other of said alternators, magnetic amplifiers having their inputs connected to said voltage providing means, and means including means using the outputs of said amplifiers for adjusting one of said alternators until said voltages are equal, said adjusting means comprising a polarized relay with two coils connected to said amplifiers, said relay having an armature with a first contact between second and third contacts, and comprises a motor which is energized when said first contact touches second contact to rotate in one direction and is energized when said first contact touches said third contact to rotate in the other direction, comprises a rotatable voltage adjusting means driven by said motor, one of said alternators having a field winding with an exciter connected thereto, and in which the rotatable voltage adjusting means comprises a rheostat connected between said exciter and field winding, the other alternator having a field winding with an exciter connected thereto, and in which the voltage deriving means comprise shunts connected between said field windings and said exciters.

References Cited in the file of this patent

UNITED STATES PATENTS

| Re. 17,953 | McDonald | Feb. 3, 1931 |
| 1,548,754 | Sargeant | Aug. 4, 1925 |
| 1,970,415 | Byles | Aug. 14, 1934 |
| 2,364,936 | Bany | Dec. 12, 1944 |
| 2,499,200 | Somerville | Feb. 28, 1950 |
| 2,725,517 | Rogers | Nov. 29, 1955 |

FOREIGN PATENTS

| 468,775 | Great Britain | Oct. 8, 1935 |